United States Patent
Gupta et al.

(10) Patent No.: US 8,370,198 B2
(45) Date of Patent: Feb. 5, 2013

(54) REGISTERING MEDIA FOR CONFIGURABLE ADVERTISING

(75) Inventors: Ashish Gupta, Seattle, WA (US); Mark Masterson, Seattle, WA (US); Brian Tschumper, Woodinville, WA (US); Phani Vaddadi, Jr., Issaquah, WA (US); Shankar Vaidyanathan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 326 days.

(21) Appl. No.: 12/404,281

(22) Filed: Mar. 14, 2009

(65) Prior Publication Data

US 2010/0235238 A1    Sep. 16, 2010

(51) Int. Cl.
    *G06Q 30/00*    (2012.01)
(52) U.S. Cl. ............... 705/14.1; 705/14.4; 705/14.61
(58) Field of Classification Search .......... 705/14
    See application file for complete search history.

(56) References Cited

U.S. PATENT DOCUMENTS

| | | | |
|---|---|---|---|
| 5,933,811 A | 8/1999 | Angles et al. | |
| 6,169,542 B1 | 1/2001 | Hooks et al. | |
| 6,411,992 B1* | 6/2002 | Srinivasan et al. | 709/218 |
| 6,505,169 B1 | 1/2003 | Bhagavath et al. | |
| 6,773,344 B1 | 8/2004 | Gabai et al. | |
| 2003/0101451 A1 | 5/2003 | Bentolila et al. | |
| 2003/0158777 A1 | 8/2003 | Schiff et al. | |
| 2004/0019900 A1 | 1/2004 | Knightbridge et al. | |
| 2004/0030599 A1* | 2/2004 | Sie et al. | 705/14 |
| 2006/0230331 A1* | 10/2006 | Abanami et al. | 715/500 |
| 2006/0245742 A1 | 11/2006 | Ashley et al. | |
| 2007/0038567 A1* | 2/2007 | Allaire et al. | 705/50 |
| 2007/0073584 A1* | 3/2007 | Grouf et al. | 705/14 |
| 2008/0040215 A1* | 2/2008 | Huang et al. | 705/14 |
| 2008/0262912 A1* | 10/2008 | Gargi | 705/14 |
| 2008/0276266 A1 | 11/2008 | Huchital et al. | |
| 2010/0153839 A1* | 6/2010 | Wilkins | 715/235 |
| 2010/0175079 A1* | 7/2010 | Braun et al. | 725/32 |

FOREIGN PATENT DOCUMENTS

WO    2008047363 A2    4/2008

OTHER PUBLICATIONS

"YuMes take2video Blog >> Hulu", Retrieved at<<http://www.yume.com/blog/tag/hulu/>>, Jun. 26, 2008, pp. 4.
Kaye Kate, "Video Ad Firm Adap.tv Launches to Serve Direct Response Advertisers", Retrieved at<<http://www.clickz.com/showPage.html?page=3625848>>, May 14, 2007, p. 1.

* cited by examiner

*Primary Examiner* — John Weiss
*Assistant Examiner* — Vincent Cao
(74) *Attorney, Agent, or Firm* — Westman, Champlin & Kelly, P.A.

(57) ABSTRACT

A method for registering a media for configurable advertising is described herein. Advertising policies from a publisher of the media may be received at a video advertising platform. A request from the publisher to register the media for advertising may be received at a video advertising platform. The request may have media metadata. A media manifest may be generated at the video advertising platform. The media manifest may be based on the media metadata and the advertising policies. The media manifest may be configured to be received by a media player. The media player may play the media with one or more advertisements as specified by the media manifest.

20 Claims, 3 Drawing Sheets

REGISTERING MEDIA FOR CONFIGURABLE ADVERTISING

BACKGROUND

According to current models of advertising, breaks to show advertisements may be defined according to a schedule. As a result, the broadcasting of video programs, such as television broadcasting may be designed to accommodate the advertising schedule. When the time for an advertising break arrives, the television program is interrupted. At the end of the advertising break, the television program may resume, or another television program may start.

One drawback with this model is that the producer of the program cannot control the occurrence, or timing, of the advertising breaks. This may lead to incongruous, inappropriate, or ineffective advertisements being displayed to viewers. Advertising breaks according to a fixed schedule can be disruptive to the natural flow of a television program. As a result, the viewer experience when watching a program may be degraded, and the effectiveness of the advertisements may decrease.

Similar issues arise when advertising within Internet-based video. Videos that are distributed within an IP-based system typically have advertising breaks hardwired into specific time slots, which may also degrade the viewer experience, and the effectiveness of advertising.

SUMMARY

Described herein are implementations of various technologies for registering media for configurable advertising. The media may include audio, video, or other multimedia presentations that is distributed over the Internet. A publisher of the media may register the media with a video advertising platform (VAP). The VAP may receive ad policies and a registration request from the publisher.

The ad policies may specify information such as how much and what types of advertising are to be shown within the media. The possible ad policies may be extensive, and can be configured by the publisher. Ad policies may be assigned to specific media, or to more general categories.

The registration request may include media metadata, such as a title, a video length, actors, or any information the publisher wants to provide that describes the media.

The VAP may generate a media manifest that maps the applicable ad policies to the registered media. The media manifest may describe a specific advertising schedule for the registered media. The media manifest may also specify an ad delivery server that provides the specific advertisements.

Upon registering, the VAP may expose web service application programming interfaces (APIs) to the publisher. The publisher may use the web service APIs to update the media metadata and the ad policies. Updates from the publisher trigger a re-generation of the media manifest with new, or updated, policies.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

In general, one or more implementations of various technologies described herein are directed towards registering media for configurable advertising. The various implementations will be described in more detail in the following paragraphs.

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 1:
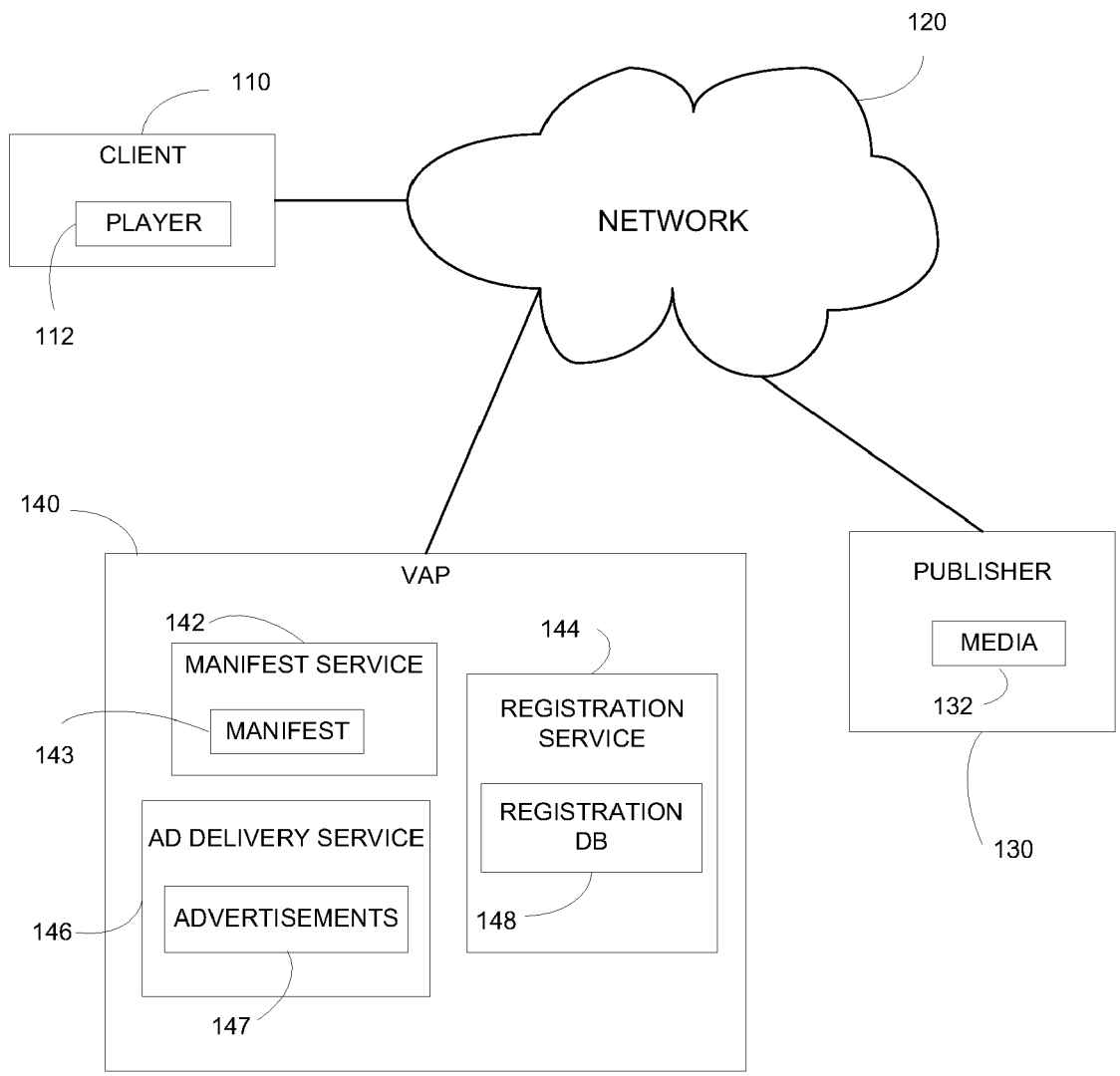
FIG. 1 shows a block diagram of a system configured to deliver an advertisement to a media player in accordance with implementations described herein.

FIG. 1 shows a block diagram of a system 100 configured to deliver an advertisement 147 to a media player 112 in accordance with implementations described herein. The system 100 may include the client 110, a publisher 130, and a video advertising platform (VAP) 140, all of which may be in communication over a network 120.

The network 120 may be any network or collection of networks that facilitates communication between the client 110, the publisher 130, and the VAP 140, as described herein. In one implementation, the network 120 is the Internet.

The client 110 may be a computing system on which the media player 112 is executed. The media player 112 may be software that plays back multimedia files, such as a media 132. The media 132 may be an audio file, a video file, streaming versions of the same, or the like.

In one implementation, the media player 112 may only play back video, such as television shows, movies, and on-line video segments. In such an implementation, the media player 112 may be known as a video player. In another implementation, the media player 112 may play back both audio and video files, such as the Windows® Media Player®.

A user may operate the media player 112 to request the media 132 from the publisher 130 for playback on the client 110. The publisher 130 may be a computing system that provides access to the media 132. The publisher 130 may be operated by a media distribution company, such as television networks, Internet portals, and the like.

In one implementation, the media 132 may be provided to the publisher 130 by a content owner (not shown) that produces the media 132. For example, the content owner may specialize in producing video media, and send a video to the publisher 130 for distribution to the user. The content owner may be a movie production studio, a television production company, or the like.

The publisher 130 may provide access to the video for the user via a content delivery network (CDN). The CDN (not shown) may be a system of computers networked together across the Internet that cooperate transparently to deliver content, i.e., media 132, to users. The CDN is typically used for the purpose of delivering the media 132 with high performance, scalability, and cost efficiency. Some examples of CDNs include Amazon® Cloudfront®, Limelight Networks®, and BitGravity®.

The media 132 may be used to generate revenue through advertising. The VAP 140 may facilitate advertising with the playback by the media player 112. In one implementation, the VAP 140 may provide a manifest 143 to the media player 112.

The manifest 143 may specify how and when the advertisements 147 are shown with the playback of the media 132. For example, the manifest 143 may specify that the advertisements 147 are shown during a break at the 15 minute mark of the playback. In one implementation, the manifest 143 may be in an XML format.

The VAP 140 may include a manifest service 142, a registration service 144, and an ad delivery service 146. The manifest service 142 may receive a request for the manifest 143 from the media player 112. In response, the manifest service 142 may determine the manifest 143 for the media 132 and the media player 112. The manifest service 142 may then send the manifest 143 to the media player 112.

The manifest 143 may also specify one or more uniform resource locators (URLs) from which the media player 112 obtains the advertisements 147. In one implementation, the URL may specify the ad delivery service 146, or a third party ad delivery service (not shown).

The manifest 143 may be generated based on preferences provided to the registration service 144 by the publisher 130. In one implementation, the publisher may register the media 132 for advertising with the VAP 140. In such an implementation, the registration service 144 may receive a registration request from the publisher 130.

The registration request may include media metadata. The media metadata may describe the media 132 itself. Media metadata may include a title, participants (such as actors, writers, and directors), a time length, a release date and the like.

Additionally, the registration service 144 may receive ad policies from the publisher 130. The ad policies may describe rules for presenting the advertisement 147 to the user. The policies may be defined by the publisher at several levels of hierarchy. For example, policies may be defined for the publisher, for a particular piece of media, a class of media (such as television, movies), and a type of the media player 112 that performs the playback.

Ad policies may include an ad-program ratio (e.g., a ratio between the time length of the advertisement 147 and the video); an ad duration; an ad replay policy (e.g., how frequently the advertisement 147 can be played); a number of ad positions available during the playback; a maximum number of ads per ad position; a "click to continue" option (e.g., whether user is allowed to click an input device on the client 110 to continue the playback without completion of the advertisement 147); and an ad skip threshold (e.g., a number of advertisements the user is allowed to skip during playback, or a duration of the advertisement 147 that is shown before the user is allowed to skip the remainder of the advertisement 147).

The number of ad positions available during the playback may specify how many opportunities for advertising the publisher 130 allots in the media. For example, the publisher 130 may allot 4 ad positions within a video. Each ad position may specify a time during playback of the video when the media player 112 may show the advertisements 147.

However, all available ad positions may not be used during the playback. Other ad policies may affect the number of ad positions used. For example, a low ad-program ratio, for example, may limit the number of ad positions that the media player 112 may use for advertising.

Ad policies may also include an ad type. The ad type may describe a format for advertising during the playback. For example, ad types may include linear, non-linear, pre-roll, and post-roll advertisements. In one implementation, ad policies may include the enablement of specified ad types.

The linear type advertisement may indicate that the advertisement 147 may be shown while the playback is paused, and the playback is resumed when the advertisement 147 completes. The non-linear type advertisement may indicate that the advertisement 147 is shown during the playback, typically in a format like a graphic overlay or rolling text.

The pre-roll type advertisement may indicate that the advertisement 147 is shown prior to starting the playback. Similarly, the post-roll type advertisement may indicate that the advertisement 147 is shown after finishing the playback.

In one implementation, the registration service 144 may store the registration request, ad policies, media metadata, and advertising metadata in the registration database 148. Additionally, the registration service 144 may create the manifest 143 for the registered media based on the ad policies, media metadata, and advertising metadata.

It should be understood that the ad policies, ad types, media metadata, and advertising metadata described above are merely for illustration, and not intended to be limiting. Implementations of the various techniques described herein may include other ad policies, ad types, media metadata, and advertising metadata.

In implementations of the various techniques described herein, the VAP 140 may be a single server, or multiple distributed servers interoperating across the network 120. Further, the components of VAP 140 (manifest service 142, registration service 144, and ad delivery service 146) may be implemented on these distributed devices.

Figure 2:
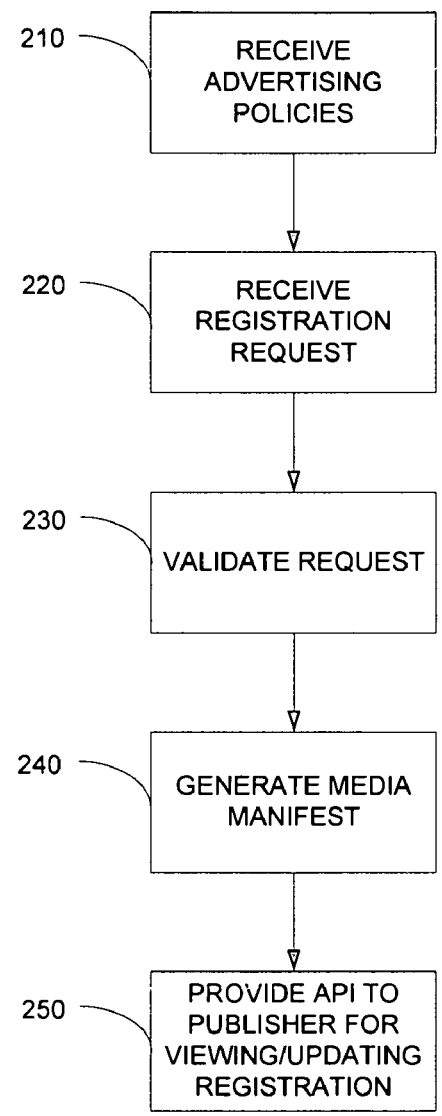
FIG. 2 illustrates a flowchart of a method for registering media for configurable advertising in accordance with implementations described herein.

FIG. 2 illustrates a flowchart of a method 200 for registering media for configurable advertising in accordance with various implementations of the technologies described herein. The registration service 144 may perform method 200. It should be understood that while the flow chart indicates a particular order of execution, in some implementations, certain steps of method 200 may be executed in a different order.

At step 210, the registration service 144 may receive the ad policies from the publisher 130. In addition to the description of ad policies described above, the ad policies may be dynamically configurable by the publisher 130 to customize advertising schemes.

For example, the ad policies may be defined in an extensible format, such as XML. Advantageously, by using XML to define the ad policies, the publisher 130 may create new types of ad policies in order to create highly customized advertising schemes.

For example, the publisher 130 may define an ad policy based on a type of client 110. The type of client 110 may include a variety of viewer devices, such as set-top boxes, mobile phones, personal computers, gaming system, and the like.

In such a case, that ad policy for the click-to-continue option may be varied based on the client type. For example, one ad policy may specify that the "click to continue" option is not available for ads sent to a television set. Another ad policy may specify that the "click to continue" option is available for ads sent to a personal computer.

At step 220, the registration service 144 may receive the registration request. As stated previously, the registration request may contain metadata about the media 132. In one implementation, the registration request may also include advertising metadata, such as the number of available ad positions in the media 132.

Further, the media metadata may be used to assign an ad policy to one or more media. For example, the media metadata may include a producer, a title, and an age-based rating. A particular ad policy may be defined for all media from the same producer, all media with the same title, or all media rated for viewers 13 years of age and older.

In one implementation, the registration request may also include reporting preferences for the media 132. Reporting may show how successful the ad policies are for the media 132, and provide information that can help improve advertising through updates to the ad policies, etc. For example, reporting may show how often the user uses the click-to-continue option, or how often the user buys a product in response to the advertisement 147.

At step 230, the registration service 144 may validate the request. The validation may apply standard edits to the metadata in the request to ensure the registration request is valid. For example, the registration service 144 may edit for spelling, punctuation, etc.

In one implementation, the registration service 144 may compare ad policies to verify that ad policies do not conflict. For example, if one ad policy states that the click to continue option is not available for television, but another ad policy states that the click to continue option is available for television, the registration request may be rejected as invalid.

At step 240, the media manifest 143 may be generated. The media manifest 143 may be generated by determining all of the applicable ad policies for the media 132. Each applicable ad policy may then be translated into a specific advertising scheme for the media.

For example, the ad policies may specify that the media 132 include a pre-roll advertisement, and that the program-ad ratio is 10%. If the media is 30 minutes long, the media manifest 143 may specify that 3 minutes (10% of 30 minutes) of advertising be shown before the playback.

At step 250, an application programming interface (API) may be provided for the publisher to view, and update the registration and ad policies. The APIs may enable the publisher to update or create new ad policies, media metadata, and advertising metadata. In one implementation, the API may be a web service API.

If the publisher sends updates for a particular media, the method 200 may be repeated to generate a new media manifest 143. The new media manifest 143 may be provided for all future requests for playback of the media 132.

Figure 3:
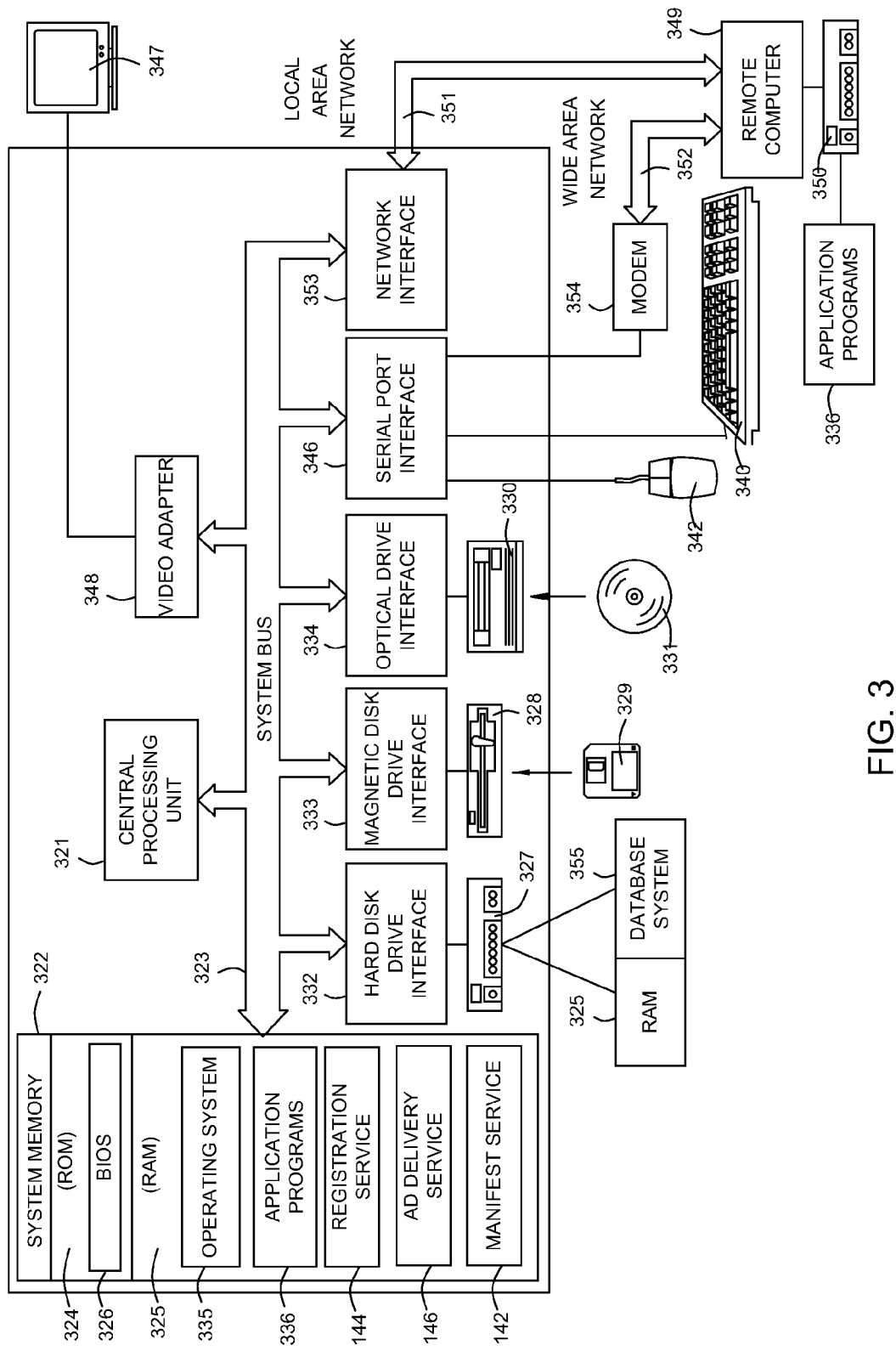
FIG. 3 illustrates a schematic diagram of a computing system in which the various technologies described herein may be incorporated and practiced.

FIG. 3 illustrates a schematic diagram of the VAP 140 in which the various technologies described herein may be incorporated and practiced. The VAP 140 may include a central processing unit (CPU) 321, a system memory 322 and a system bus 323 that couples various system components including the system memory 322 to the CPU 321. Although only one CPU is illustrated in FIG. 3, it should be understood that in some implementations the VAP 140 may include more than one CPU.

The system bus 323 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 322 may include a read only memory (ROM) 324 and a random access memory (RAM) 325. A basic input/output system (BIOS) 326, containing the basic routines that help transfer information between elements within the VAP 140, such as during start-up, may be stored in the ROM 324.

The VAP 140 may further include a hard disk drive 327 for reading from and writing to a hard disk, a magnetic disk drive 328 for reading from and writing to a removable magnetic disk 329, and an optical disk drive 330 for reading from and writing to a removable optical disk 331, such as a CD ROM or other optical media. The hard disk drive 327, the magnetic disk drive 328, and the optical disk drive 330 may be connected to the system bus 323 by a hard disk drive interface 332, a magnetic disk drive interface 333, and an optical drive interface 334, respectively. The drives and their associated computer-readable media may provide nonvolatile storage of computer-readable instructions, data structures, program modules and other data for the VAP 140.

Although the VAP 140 is described herein as having a hard disk, a removable magnetic disk 329 and a removable optical disk 331, it should be appreciated by those skilled in the art that the VAP 140 may also include other types of computer-readable media that may be accessed by a computer. For example, such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the VAP 140.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

A number of modules may be stored on the hard disk, magnetic disk 329, optical disk 331, ROM 324 or RAM 325, including an operating system 335, one or more application programs 336, the manifest service 142, the registration service 144, the ad delivery service 146, and a database system 355. The operating system 335 may be any suitable operating system that may control the operation of a networked personal or server computer, such as Windows® Vista, Mac OS® X, Unix-variants (e.g., Linux® and BSD®), and the like.

The registration service 144 may receive registration requests from the publisher 130, and generate manifests for delivery by the manifest service 142. The registration service 144 may also provide an interface to the publisher 130 that the publisher may use to view, and update, a registration. The ad delivery service 146 may receive advertisement requests from the media player 112, and send the advertisement 147 in response.

A user may enter commands and information into the VAP 140 through input devices such as a keyboard 340 and pointing device 342. Other input devices may include a microphone, joystick, game pad, satellite dish, scanner, or the like. These and other input devices may be connected to the CPU 321 through a serial port interface 346 coupled to system bus 323, but may be connected by other interfaces, such as a parallel port, game port or a universal serial bus (USB). A monitor 347 or other type of display device may also be connected to system bus 323 via an interface, such as a video adapter 348. In addition to the monitor 347, the VAP 140 may further include other peripheral output devices, such as speakers and printers.

Further, the VAP 140 may operate in a networked environment using logical connections to one or more remote computers, such as a remote computer 349. The remote computer 349 may be another personal computer, a server, a router, a network PC, a peer device or other common network node. Although the remote computer 349 is illustrated as having only a memory storage device 350, the remote computer 349 may include many or all of the elements described above relative to the VAP 140. The logical connections may be any connection that is commonplace in offices, enterprise-wide computer networks, intranets, and the Internet, such as local area network (LAN) 351 and a wide area network (WAN) 352.

When using a LAN networking environment, the VAP 140 may be connected to the LAN 351 through a network interface or adapter 353. When used in a WAN networking environment, the VAP 140 may include a modem 354, wireless router or other means for establishing communication over a wide area network 352, such as the Internet. The modem 354, which may be internal or external, may be connected to the system bus 323 via the serial port interface 346. In a networked environment, program modules depicted relative to the VAP 140, or portions thereof, may be stored in a remote memory storage device 350. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device.

One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for registering a media for advertising, comprising:
    receiving, at a video advertising platform having a processing unit, one or more predefined advertising policies from a media publisher, the one or more predefined advertising policies received at the video advertising platform being separate from a media and comprising rules for presenting advertisements to a user during media playback;
    receiving, at the video advertising platform, a request from the media publisher to register the media published by the media publisher for advertising, the request having media metadata pertaining to the media;
    selecting, at the video advertising platform, at least one of the received advertising policies based on the media metadata pertaining to the media; and
    generating, at the video advertising platform using the processing unit, a media manifest for the media using the selected at least one advertising policy, the media manifest indicating an advertising schedule for one or more advertisements during a playback of the media.

2. The method of claim 1, further comprising providing an interface to the publisher to enable the publisher to update the advertising policies and the media metadata.

3. The method of claim 2, wherein the interface is a web service application programming interface.

4. The method of claim 2, further comprising:
    receiving an update request from the publisher via the interface, wherein the update request comprises new advertising policies;
    generating updated advertising policies based on the new advertising policies; and
    re-generating the media manifest based on the media metadata and the updated advertising policies.

5. The method of claim 1, wherein the media metadata comprise at least one of:
    a title of the media, a participant in the media, a producer of the media, a time length of the media, a release date of the media, and an age-based rating of the media.

6. The method of claim 1, wherein the advertising policies comprise one or more of:
    an advertisement duration, an advertisement-program ratio, an advertisement type, a maximum number of one or more advertisement positions, a maximum number of advertisement for each of the advertisement positions, a pre-roll enablement, a post-roll enablement, a click-to-continue option, and an advertisement skip threshold.

7. The method of claim 6, wherein the advertisement duration specifies a length of the one or more advertisements; the advertisement-program ratio specifies a ratio between a length of the media and the advertisement duration; the advertisement type specifies whether the one or more advertisements are a linear ad type, a non-linear ad type, a pre-roll ad type, or a post-roll ad type; the maximum number of the advertisement positions specifies a limit on a number of times, during a playback of the media, that the one or more advertisements are shown; the pre-roll enablement specifies whether the one or more advertisements are shown before the playback; the post-roll enablement specifies whether the one or more advertisements are shown after the playback; the click-to-continue option specifies whether a user is allowed to continue the playback without completion of the one or more advertisements; and the ad skip threshold specifies either a number of times that the user is allowed to skip the one or more advertisements during the playback, or a duration of the one or more advertisements that is shown before the user uses the click-to-continue option.

8. The method of claim 7, wherein the linear advertisement type indicates that the one or more advertisements are shown while the playback is paused, and the playback is resumed when the one or more advertisements ends.

9. The method of claim 7, wherein the non-linear advertisement type indicates that the one or more advertisements are shown during the playback.

10. The method of claim 6, wherein the advertisement positions specify one or more times during a playback when the one or more advertisements are shown.

11. The method of claim 6, wherein the media manifest specifies at least one of the advertisement positions.

12. The method of claim 6, wherein the media manifest specifies at least one uniform resource locator from which the one or more advertisements are obtained.

13. The method of claim 6, wherein the media manifest specifies the advertisement type of the one or more advertisements.

14. The method of claim 6, wherein the media manifest specifies whether the click-to-continue option is available for a user.

15. The method of claim 1, wherein receiving the one or more predefined advertising policies comprises storing the one or more predefined advertising policies, and generating the media manifest comprises accessing the stored at least one advertising policy that is selected based on the media metadata.

16. A computer-readable storage medium, comprising program instructions executable by a computer processor to:
receive, at a video advertising platform, a plurality of different advertising policies from a media publisher, the plurality of different advertising policies received at the video advertising platform each comprising rules for presenting advertisements to a user during media playback;
receive, at the video advertising platform, a request from the media publisher to register a media published by the media publisher for advertising, the request having media metadata including information about the media that is received from the media publisher separate from and subsequent to the plurality of different advertising policies being received at the video advertising platform;
select, at the video advertising platform, at least one of the received advertising policies based on the media metadata; and
generate, at the video advertising platform, a media manifest using the selected at least one advertising policy, wherein the media manifest specifies how and when the one or more advertisements are shown during a playback of the media.

17. The computer-readable storage medium of claim 16, wherein the media manifest specifies how and when the one or more advertisements are shown by:
specifying at least one uniform resource locator from which the one or more advertisements are obtained;
specifying a position within the media when the one or more advertisements are shown; and
specifying a time during the playback when the one or more advertisements are shown.

18. The computer-readable storage medium of claim 16, and further comprising program instructions executable by a computer processor to:
store the plurality of advertising policies received at the video advertising platform; and
generate the media manifest by accessing the stored at least one advertising policy that is selected based on the media metadata.

19. A computer system, comprising:
a processor; and
a memory comprising program instructions executable by the processor to:
receive, at a video advertising platform, a plurality of different advertising policies from a publisher of a media, each comprising rules for presenting advertisements to a user during media playback;
receive, at the video advertising platform, a request from the publisher to register the media for advertising, the request having media metadata including information describing the media;
generate, at the video advertising platform, a media manifest based on one or more advertising policies selected from the plurality of advertising policies based on the media metadata, wherein the media manifest indicates an advertising schedule for one or more advertisements during a playback of the media;
provide a web service application programming interface (API) to the publisher that enables the publisher to update the advertising policies and the media metadata;
receive an update request having a new advertising policy from the publisher via the web service API;
generate updated advertising policies based on the new advertising policy; and
re-generate, at the video advertising platform, the media manifest based on the media metadata and the updated advertising policies.

20. The system of claim 19, wherein the media manifest specifies how and when one or more advertisements are shown during a playback of the media.

* * * * *